(12) United States Patent
Choi et al.

(10) Patent No.: US 12,540,431 B2
(45) Date of Patent: Feb. 3, 2026

(54) METHOD FOR CONTROLLING LAUNDRY TREATMENT APPARATUS

(71) Applicant: LG ELECTRONICS INC., Seoul (KR)

(72) Inventors: Woonje Choi, Seoul (KR); Boosung Kim, Seoul (KR); Sejin Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 822 days.

(21) Appl. No.: 17/543,870

(22) Filed: Dec. 7, 2021

(65) Prior Publication Data

US 2022/0186419 A1 Jun. 16, 2022

(30) Foreign Application Priority Data

Dec. 11, 2020 (KR) .................. 10-2020-0173544

(51) Int. Cl.
*D06F 34/00* (2020.01)
*D06F 29/00* (2006.01)
(Continued)

(52) U.S. Cl.
CPC .......... *D06F 34/10* (2020.02); *D06F 29/005* (2013.01); *D06F 31/00* (2013.01); *D06F 33/32* (2020.02);
(Continued)

(58) Field of Classification Search
CPC ........ D06F 34/10; D06F 29/005; D06F 34/06; D06F 34/18; D06F 58/203; D06F 58/38;
(Continued)

(56) References Cited

U.S. PATENT DOCUMENTS 8,091,389 B2  1/2012  Park et al.
2011/0185511 A1  8/2011  Ryoo et al.
(Continued)

FOREIGN PATENT DOCUMENTS

CA   3059536 A1 * 10/2018  ............. D06F 33/00
CN   1944767     4/2007
(Continued)

OTHER PUBLICATIONS

Translation of 2005/0091299 Seo Hyun Seok p. 4 (Year: 2005).*
(Continued)

*Primary Examiner* — Levon J Shahinian
*Assistant Examiner* — Lauren G Orta
(74) *Attorney, Agent, or Firm* — KED & ASSOCIATES, LLP

(57) ABSTRACT

A method for controlling a laundry treatment includes performing, by the lower treatment device, a washing course including a water supply step, a washing (rinsing) step, and a dehydration step, and performing, by the upper treatment device, a drying course including a hot air supply step, a fan operation step, and a dryness sensing step. The lower treatment device performs the washing course by changing a configuration of at least one of an operation of the tub heater, an execution time of the washing course, and an operation of the lower driver according to a progress state of the drying course, thereby performing the washing course.

6 Claims, 8 Drawing Sheets

(51) Int. Cl.
| | |
|---|---|
| *D06F 31/00* | (2006.01) |
| *D06F 33/32* | (2020.01) |
| *D06F 33/46* | (2020.01) |
| *D06F 33/50* | (2020.01) |
| *D06F 33/68* | (2020.01) |
| *D06F 33/72* | (2020.01) |
| *D06F 34/06* | (2020.01) |
| *D06F 34/10* | (2020.01) |
| *D06F 34/18* | (2020.01) |
| *D06F 34/28* | (2020.01) |
| *D06F 58/20* | (2006.01) |
| *D06F 58/38* | (2020.01) |
| *D06F 58/44* | (2020.01) |
| *D06F 58/48* | (2020.01) |
| *D06F 103/08* | (2020.01) |
| *D06F 103/52* | (2020.01) |
| *D06F 105/28* | (2020.01) |
| *D06F 105/40* | (2020.01) |
| *D06F 105/52* | (2020.01) |

(52) U.S. Cl.
CPC .............. *D06F 33/46* (2020.02); *D06F 33/50* (2020.02); *D06F 33/68* (2020.02); *D06F 33/72* (2020.02); *D06F 34/06* (2020.02); *D06F 34/18* (2020.02); *D06F 34/28* (2020.02); *D06F 58/203* (2013.01); *D06F 58/38* (2020.02); *D06F 58/44* (2020.02); *D06F 58/48* (2020.02); *D06F 2103/08* (2020.02); *D06F 2103/52* (2020.02); *D06F 2105/28* (2020.02); *D06F 2105/40* (2020.02); *D06F 2105/52* (2020.02)

(58) Field of Classification Search
CPC ...... D06F 58/44; D06F 58/48; D06F 2103/08; D06F 2105/28; D06F 2105/40; D06F 2105/52; D06F 33/32; D06F 33/68; D06F 33/72; D06F 2103/52; D06F 33/46; D06F 33/50; D06F 31/00; D06F 34/28
See application file for complete search history.

(56) References Cited

U.S. PATENT DOCUMENTS

| | | | |
|---|---|---|---|
| 2011/0252835 A1 | 10/2011 | Beihoff et al. | |
| 2018/0230640 A1 | 8/2018 | Bilionis et al. | |
| 2018/0355549 A1 * | 12/2018 | Bilionis | D06F 33/46 |
| 2020/0024784 A1 | 1/2020 | Yoon et al. | |
| 2021/0297280 A1 | 9/2021 | Jeong et al. | |

FOREIGN PATENT DOCUMENTS

| | | | | |
|---|---|---|---|---|
| CN | 203700813 | | 7/2014 | |
| CN | 107541892 | | 1/2018 | |
| CN | 109518411 | | 3/2019 | |
| CN | 110409153 | | 11/2019 | |
| EP | 2 540 895 A1 | | 1/2013 | |
| EP | 2617887 | | 7/2013 | |
| EP | 2617887 A1 * | | 7/2013 | D06F 58/206 |
| EP | 3 250 746 | | 12/2017 | |
| KR | 20050091299 A * | | 9/2005 | D06F 58/38 |
| WO | WO 2009/020309 | | 2/2009 | |
| WO | WO 2011/057955 | | 5/2011 | |
| WO | WO 2012/086345 | | 6/2012 | |
| WO | WO 2016/122275 | | 8/2016 | |
| WO | WO-2019052410 A1 * | | 3/2019 | D06F 29/005 |
| WO | WO 2019/154266 A1 | | 8/2019 | |
| WO | WO-2019196740 A1 * | | 10/2019 | |
| WO | WO 2020/027578 | | 2/2020 | |

OTHER PUBLICATIONS

KR20050091299 (Year: 2005).*
WO2019052410 translation (Year: 2019).*
WO2019196740 translation (Year: 2019).*
Chinese Office Action dated Apr. 29, 2023 issued in Application No. 202111482995.6.
European Search Report dated May 12, 2022 issued in EP Application No. 21213466.2.
Extended European Search Report dated Dec. 9, 2024 issued in Application 24195673.9.

* cited by examiner

METHOD FOR CONTROLLING LAUNDRY TREATMENT APPARATUS

CROSS-REFERENCE TO RELATED APPLICATION

This application claims the benefit of Korean Patent Application No. 10-2020-0173544, filed in Korea on Dec. 11, 2020, which is hereby incorporated by reference as if fully set forth herein.

BACKGROUND

1. Field

The present disclosure relates to a method for controlling a laundry treatment apparatus, and more particularly to a method for controlling a laundry treatment apparatus in which an upper treatment machine and a lower treatment machine are stacked to increase space utilization, and allowing the two machines (i.e., the upper treatment machine and the lower treatment machine) to be driven by only one power source.

2. Background

Generally, laundry treatment apparatuses can be classified into a front-loading type laundry treatment device and a top-loading type laundry device according to how laundry is put into and treated in the laundry treatment apparatus. In addition, laundry treatment apparatuses can also be largely classified into a washing machine for washing laundry and a drying machine for drying laundry according to how laundry is treated in the laundry treatment apparatus.

In recent years, the front-loading type washing machine has a smaller height, a larger washing capacity (i.e., a larger laundry treating capacity), and less laundry entanglement as compared to the top-loading type washing machine in which an inner tub (i.e., a washing tub) is installed upright and rotates, so that the demand for front-loading type washing machines is rapidly increasing.

On the other hand, the front-loading type washing machine includes a tub provided in a cabinet forming an exterior appearance thereof, a drum rotatable in the tub, and a driver for rotating the drum, such that contaminants of laundry can be removed by friction between laundry and wash water in the rotating drum.

In addition, an improved drying machine including a cabinet similar in shape to the external appearance of the front-loading type washing machine has recently been developed and manufactured, which allows the cabinet to include a rotatable drying drum, a driver for rotating the drying drum, and a hot air supply device for producing high-temperature drying air to perform drying of washed wet laundry and the like.

When the washing machine and the drying machine according to the prior art are installed at the same time, the washing machine and the drying machine are installed side by side in a horizontal direction on the installation surface. However, if the space for installation of both the washing machine and the drying machine is small in size, the washing machine and the drying machine are separately installed in different spaces, and wet laundry washed by the washing machine is transferred to and put into the drying machine by a user, thereby drying washed laundry.

On the other hand, in recent years, the washing machine and the drying machine are installed to be located adjacent to each other for implementation of a smaller installation space and greater convenience of use. For example, the washing machine (or the drying machine) and the drying machine (or the washing machine) may be installed in a stacked structure in which the drying machine (or the washing machine) is disposed over the washing machine (or the drying machine), or may be installed to be adjacent to each other. In addition, recently, an integrated-type laundry treatment apparatus having a stacked structure in which a washing machine or a drying machine is selectively disposed at an upper portion or a lower portion has been developed and rapidly come into widespread use.

Each of the washing machine and the drying machine according to the prior art has been designed to receive an independent power source by an independent controller thereof so that the washing machine and the drying machine can operate independently of each other. That is, each of the washing machine and the drying machine has a separate power cable for receiving a separate power source, a controller of the washing machine allows the washing machine to perform a washing cycle regardless of operation of the drying machine, and a controller of the drying machine allows the drying machine to perform a drying cycle regardless of operation of the washing machine.

However, when performing the washing cycle or the drying cycle using the washing machine or the drying machine, if current consumption of the washing machine and current consumption of the drying machine are simultaneously maximized, total current consumption of both the washing machine and the drying machine may exceed a per-household allowable value for enabling installation of the washing machine and the drying machine.

In this case, overload may occur in power supply for each household, so that a power-supply unit for each household may be shut down, or serious errors may occur in the operation time of the washing machine or the drying machine.

Therefore, when the washing machine and the drying machine are simultaneously operated, there is a need to control the operation of the washing machine or the operation of the drying machine in a manner that the washing machine or the drying machine can be controlled in response to the maximum amount of current consumption thereof.

BRIEF DESCRIPTION OF THE DRAWINGS

Embodiments will be described in detail with reference to the following drawings in which like reference numerals refer to like elements, and wherein.

DETAILED DESCRIPTION

Figure 1:
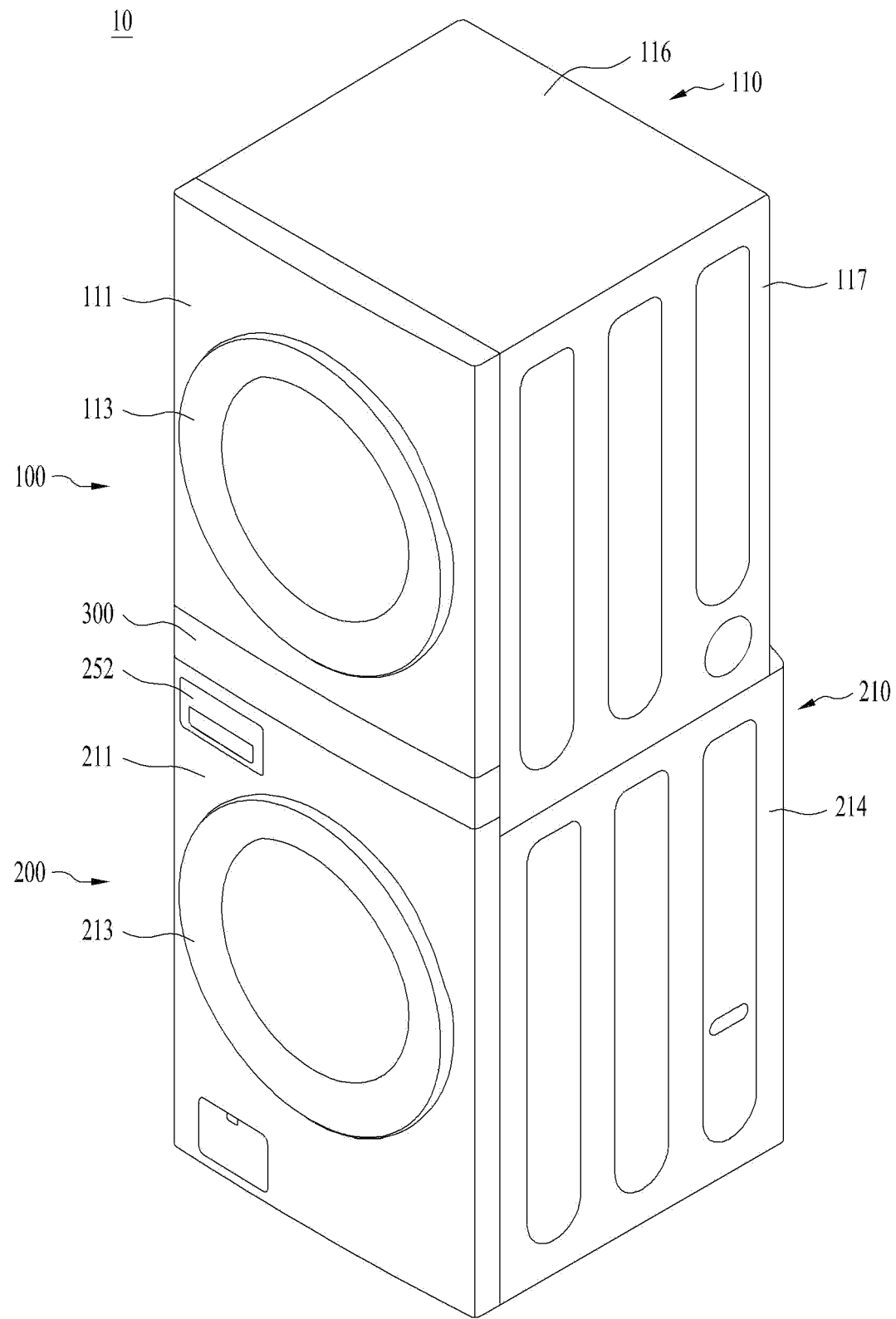
FIG. 1 is a perspective view illustrating a laundry treatment apparatus according to an embodiment of the present disclosure.

Hereinafter, a laundry treatment apparatus according to an embodiment of the present disclosure will be described with reference to the attached drawings.

In the following description of the present disclosure, names of constituent components to be defined are determined in consideration of their functions. Accordingly, it should be understood that the following description should not be construed as limiting technical components of the present disclosure. In addition, constituent elements defined in the present disclosure can also be called other names by those skilled in the art.

In addition, the same reference numbers will be used throughout the drawings to refer to the same or like parts, and redundant descriptions thereof will be omitted. In the drawings, the sizes and shapes of constituent elements may be exaggerated or reduced for convenience of description.

On the other hand, the terms "first" and "second" may be used to describe various components, but the components are not limited by the terms. The terms may be used to distinguish one component from another component.

It will be understood that, when an element is referred to as being "connected to" or "coupled to" another element, it can be directly connected to the other element, or intervening elements may also be present. In contrast, when an element is referred to as being "directly connected to" or "directly coupled to" another element, no intervening elements are present.

In description of the present disclosure, the terms "comprising," "including," and "having" shall be understood to designate the presence of particular features, numbers, steps, operations, elements, parts, or combinations thereof, but not to preclude the presence or addition of one or more other features, numbers, steps, operations, elements, parts, or combinations thereof.

In description of the present disclosure, the term "and/or" may include a combination of a plurality of items or any one of a plurality of listed items. For example, "A or B" may include "only A", "only B", and/or "both A and B".

A method for controlling a laundry treatment apparatus according to an embodiment of the present disclosure will hereinafter be described with reference to the attached drawings.

Figure 2:
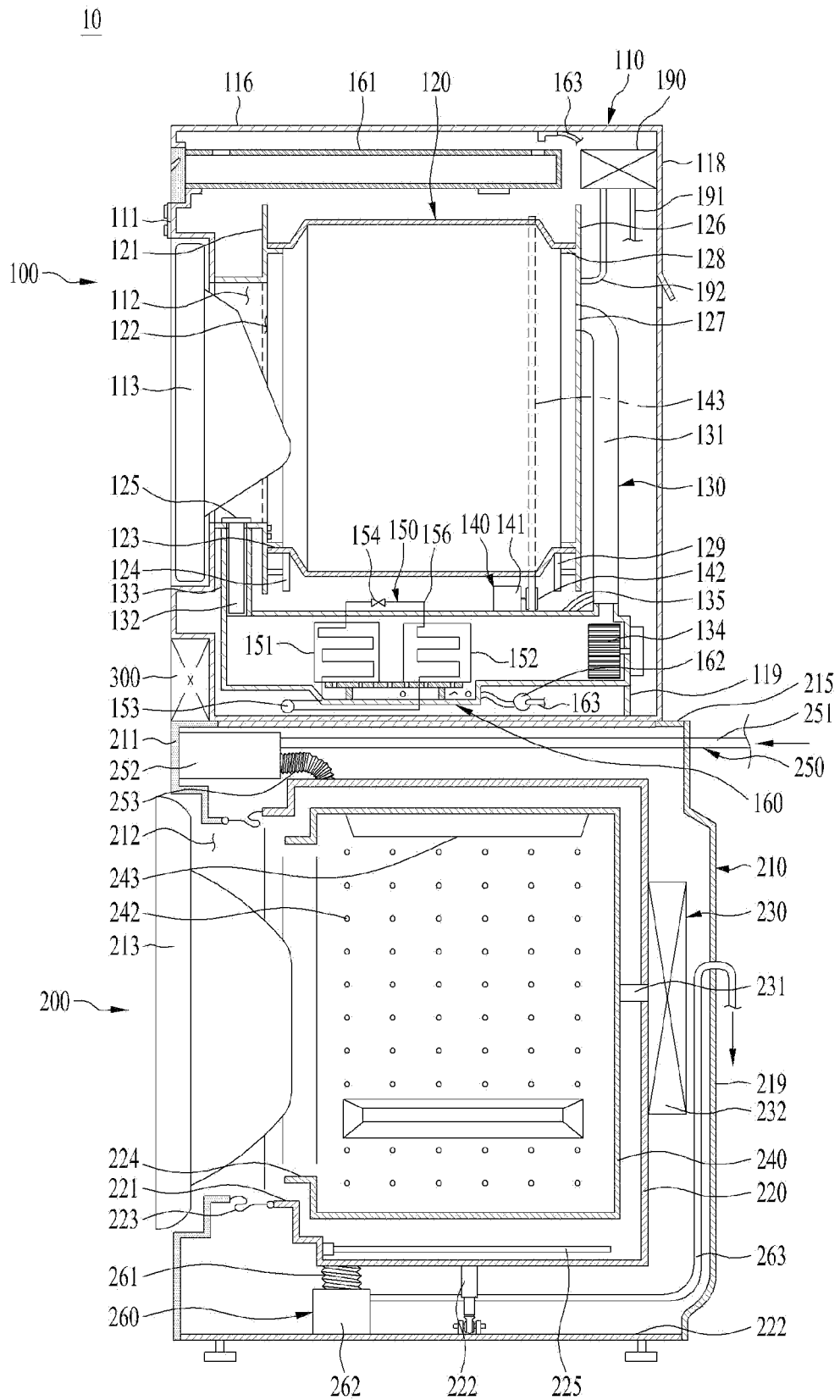
FIG. 2 is a cross-sectional view illustrating an internal structure of the laundry treatment apparatus according to an embodiment of the present disclosure.
Figure 3:
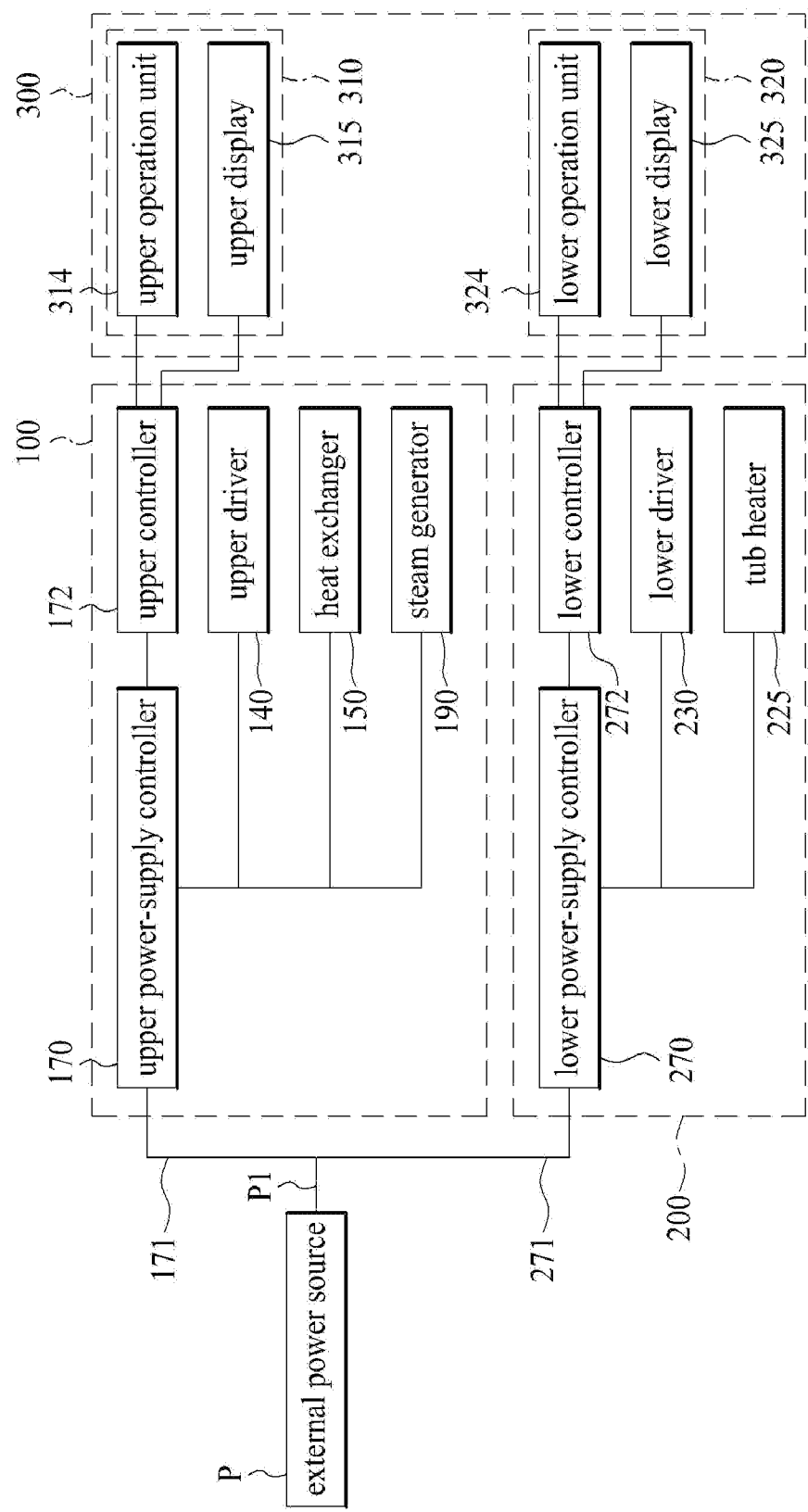
FIG. 3 is a block diagram illustrating constituent elements of the laundry treatment apparatus according to an embodiment of the present disclosure.

FIG. 1 is a perspective view illustrating a laundry treatment apparatus 10 according to an embodiment of the present disclosure. FIG. 2 is a cross-sectional view illustrating an internal structure of the laundry treatment apparatus 10 according to an embodiment of the present disclosure. FIG. 3 is a block diagram illustrating constituent elements of the laundry treatment apparatus 10 according to an embodiment of the present disclosure.

Referring to FIGS. 1 and 2, the laundry treatment apparatus 10 may include a washing machine (hereinafter referred to as a lower treatment device 200) installed at a lower space to perform washing and rinsing of target laundry, and a drying machine (hereinafter referred to as an upper treatment device 100) installed over the lower treatment device 200 to dry wet or washed laundry or target laundry to be separately dried after completion of washing.

The drying machine corresponding to the upper treatment device 100 can be classified into various types of drying machines configured to use a gas burner, an electric heater, a heat pump, etc. according to how to supply a heat source to the drying machine. For convenience of description and better understanding of the present disclosure, it is assumed that the upper treatment device 100 is implemented as the drying machine configured to use the heat pump.

However, the upper treatment device 100 is not limited thereto, and it should be understood that the upper treatment device 100 can also be implemented as all kinds of upper treatment devices each including the main components of the upper treatment device 100 even if different heat sources are applied thereto.

The upper treatment device 100 may include an upper cabinet 110 provided with an upper front panel 111, an upper top panel 116, an upper side panel 117, an upper rear panel 118, and an upper base 119, which form an external appearance thereof; a drying drum 120 rotatably provided in the upper cabinet 110 and configured in a manner that target laundry is put into and dried therein; a circulation passage portion 130 through which heated air is supplied to the drying drum 120 and is then discharged from the drying drum 120 after drying target laundry; an upper driver 140 for rotating the drying drum 120 at a predetermined rotation speed; a heat exchanger 150 for heating air in the circulation passage portion 130 and supplying the heated air; an upper drain unit 160 for discharging condensed water generated from the heat exchanger; and a steam generator 190 for supplying steam into the drying drum 120.

The upper front panel 111 may include an upper inlet 112 through which laundry to be dried is put into the drying drum 120, and an upper door 150 for opening or closing the upper inlet 112. A lower portion of the upper front panel 111 may be provided with a control panel 300 for controlling the upper treatment device 100 and the lower treatment device 100.

The upper side panel 117 and the upper rear panel 118 may be configured in different plates separated from each other, and may be formed integrally with each other by bending one panel. The upper side panel 117 and the upper rear panel 118 may be formed integrally with each other to increase the strength of the upper treatment device 100.

The upper rear panel 118 may further include a service panel (not shown) that forms a rear surface of the upper treatment device 100 and can open or close the upper rear panel 118 for maintenance of the upper treatment device 100.

A lower portion of the upper cabinet 110 may be provided with the upper base 119 where constituent components (e.g., the drying drum 120, the circulation passage portion 130, the upper driver 140, the heat exchanger 150, etc.) of the upper treatment device 100 are supported and installed.

The drying drum 120 may be formed in a cylindrical shape in which a front end and a rear end are opened. A front plate 121 and a rear plate 126 for rotatably supporting the drying drum 120 may be provided at the front side and the rear side of the drying drum 120, respectively.

The front plate 121 may be formed with an opening 122 communicating with the upper inlet 112 formed at the upper front panel 111, and may include a front support 123 that supports a front inner circumferential surface of the drying drum 120 in the direction from the outer circumferential surface of the opening 122 to the front side of the drying drum 120.

A lower portion of the front support 123 may be provided with a front roller 124 for rotatably supporting a front lower portion of the front drying drum 120. A lower portion of the front plate 121 may be provided with a plurality of intake holes 125 through which air from the drying drum 120 is sucked into the circulation passage portion 130, and an intake duct 133 of the circulation passage portion 130 is connected to the intake holes 125.

The rear plate 126 may be coupled to the supply duct 131 of the circulation passage portion 130 to be described later, and may be formed with a plurality of supply holes 127 through which air flows into the drying drum 120. A rear support 128 for supporting the rear inner circumferential surface of the drying drum 120 to the rear side of the drying drum 120 may be disposed at the outside of the supply hole 127. A rear roller 129 for rotatably supporting the lower portion of the drying drum 120 may be disposed at a lower portion of the rear support 128.

The flow passage 130 may include an intake hole 133 configured to suction air from the drying drum 120 by communicating with the intake hole 125, a supply duct 131 configured to supply the air of the intake duct 133 to the drying drum 120, a connection duct 135 configured to interconnect the intake duct 133 and the supply duct 131 and to include a heat absorption unit 151 and a heating unit 152 of the heat exchanger 150, and a fan 134 disposed between the supply duct 131 and the intake duct 133 so that air inside the drying drum 120 can circulate through the intake duct 133, the connection duct 135, and the supply duct 131.

On the other hand, a filter unit 132 for filtering foreign materials such as lint contained in the air sucked from the drying drum 120 may be detachably coupled to the intake hole 125 of the intake duct 133. In addition, the connection duct 135 may be coupled to the upper base 119, and may form a flow passage space in which the heat absorption unit 151 and the heating unit 152 are installed. In addition, the supply duct 131 may guide the air dehumidified and heated by the heat absorption unit 151 and the heating unit 152 provided in the connection duct 135 to the inside of the drying drum 120.

In this case, the circulation passage portion 130 may be configured in a manner that the air inside the drying drum 120 is sucked into the circulation passage portion 130 through the intake duct 133 according to operation of the fan 134, resulting in reduction in pressure of the drying drum 120. As the pressure of the drying drum 120 decreases, the air outside the drying drum 120 can flow into the drying drum 120 through the supply duct 131. At this time, the air flowing through the supply duct 131 may be heated by the heat exchanger 150 provided in the connection duct 135, so that the heated air can flow into the drying drum 120.

In this case, the fan 134 may be provided in any of the intake duct 133, the connection duct 135 or the supply duct 131. The following description will be given with reference to one example in which the fan 134 is disposed between the connection duct 135 and the supply duct 131 (i.e., one example in which the fan 134 is disposed at the rear side of the heating unit 152).

The heat exchanger 150 may be implemented as various kinds of devices, each of which sequentially performs dehumidifying and heating of the air introduced into the connection duct 135. The present disclosure will hereinafter be described with reference to the example in which the heat exchanger 150 is provided as a heat pump.

The heat exchanger 150 may include a heat absorption unit 151 provided in the connection duct 135 to dehumidify the air introduced into the connection duct 135, a heating unit 152 provided in the connection duct 135 to heat the air having penetrated the heat absorption unit 151, a compressor 153 to compress a refrigerant having penetrated the heating unit 152 and to supply the compressed refrigerant to the heat absorption unit 151, and a pressure regulator 154 to adjust pressure of the refrigerant having penetrated the heating unit 152. The above-described constituent components of the heat exchanger 150 may be connected to each other by a refrigerant pipe 156 through which the refrigerant flows.

Here, each of the heat absorption unit 151 and the heating unit 152 may include a plurality of metal plates arranged in parallel to the movement direction of air within a width direction of the connection duct 135 or within a height direction of the connection duct 135. The heat absorption unit 151 and the heating unit 152 may be sequentially arranged in the direction from the intake duct 133 to the supply duct 131 within the connection duct 135.

The upper driver 140 may be configured to rotate the drying drum 120 at a predetermined rotation speed. The upper driver 140 may include a motor 141 to generate power, a pulley 142 provided at a rotary shaft of the motor 141, and a belt 145 to connect the pulley 142 to the outer circumferential surface of the drying drum 120.

In this case, the pulley 142 may be provided at one end of the rotary shaft of the motor 141, and the fan 134 of the circulation passage portion 130 may be provided at the other end of the rotary shaft of the motor 141. That is, the fan 134 and the drying drum 120 of the circulation passage portion 130 can simultaneously operate by only one motor 142. At this time, since the drying drum 120 and the drum 134 are driven by only one motor 141, the drying drum 120 and the fan 134 may rotate at a predetermined rotation speed with a constant ratio therebetween.

Although not shown in the drawings, each of the drying drum 120 and the fan 134 may include a separate motor (not shown). When a separate motor is provided in each of the drying drum 120 and the fan 134, the rotation speed of the drying drum 120 and the rotation speed of the fan 134 can be controlled separately from each other.

On the other hand, the upper drain unit 160 may be configured to discharge condensed water generated in the heat absorption unit of the heat exchanger. The upper drain unit 160 may include a storage body 161 detachably coupled to the upper cabinet 110 and configured to provide a space for storing water, a drain pump 162 provided in the upper base 119 to perform pumping of condensed water generated in the heat absorption unit 151, and a drain pipe 163 to guide condensed water pumped by the drain pump 162 to the storage body.

Here, the storage body 161 may be provided as a drawer-type tank drawn out from the cabinet 110, and may be configured to form a portion of the upper front panel 111 at the front surface of the storage body 161.

On the other hand, the steam generator 190 may generate steam by heating the supplied water, may supply the generated steam to the inside of the drying drum 120, and may sterilize laundry to be treated in the drying drum 120 using high-temperature steam. Furthermore, the steam generator 190 may remove wrinkles that may occur in laundry to be dried, and may increase the volume of laundry to be dried, thereby refreshing the laundry to be dried.

The steam generator 190 may receive wash water from a water supply source (not shown) located outside the laundry treatment apparatus 10. The steam generator 190 may include a steam supply pipe 191 for supplying condensed water stored in the storage body 161 of the drain unit 160, and a steam supply pipe 192 for guiding steam generated by the steam generator to the drying drum.

The lower treatment device 200 may include a lower cabinet 210 provided with a lower front panel 211, a lower side panel 214, a lower rear panel 219, a lower top panel 215, and a lower base panel 219a, which form an external appearance thereof. The lower cabinet 210 may include a tub 220 to store wash water therein, a washing drum 240 rotatably provided in the tub 220 and configured to wash target laundry, a lower driver 230 provided at the rear side of the tub 220 so as to rotate the washing drum 240, a water supply unit 250 to supply wash water to the tub 220, a detergent supply unit 252 to mix wash water supplied from the water supply unit with detergent so as to supply a mixture of the wash water and the detergent, and a lower drain unit 260 to discharge wash water stored in the tub 220.

The lower front panel 211 may include a lower inlet 212 through which laundry to be washed can be put into the washing drum 240, and a lower door 213 to open or close the lower inlet 212.

The lower side panel 214 and the lower rear panel 219 may be configured in different plates separated from each other, and may be formed integrally with each other by bending one panel. The lower side panel 214 and the lower rear panel 219 may be formed integrally with each other to increase the strength of the lower treatment device 200.

The lower front panel 211 may be formed on the same extension surface as the upper front panel 111, and the lower side panel 214 may be formed on the same extension surface as the upper side panel 117. That is, each of the lower front panel 211 and the upper front panel 111 may include a control panel 300 located below the upper front panel 111, so that the lower front panel 211 and the upper front panel 111 can be formed to be disposed in the same plane.

In addition, the upper side panel 117 may form left and right side surfaces of the upper treatment device 100, the lower side panel 214 may form left and right side surfaces of the lower treatment device 200, and at the same time the upper side panel 117 and the lower side panel 214 may be formed to be disposed in the same plane.

On the other hand, the lower top panel 215 may be disposed over the lower front panel 211 and the lower side panel 214, may serve to partition the lower treatment device 200 and the upper treatment device 100, and may thus support the lower treatment device 200 and the upper treatment device 100.

In addition, when a fire occurs in the lower treatment device 200 or the upper treatment device 100, the lower top panel 215 may serve as a flameproof panel to prevent the fire generated in the lower treatment device 200 or the upper treatment device 100 from moving to another treatment device.

The lower rear panel 219 may form the rear surface of the lower treatment device 200, and may further include a service panel (not shown) that can open and/or close the lower rear panel 219 for maintenance of the lower treatment device 200. Also, a water supply pipe 251 of the water supply unit 250 to be described later and a drain pipe 253 of the lower drain unit 260 may be formed to penetrate the lower rear panel 219.

On the other hand, the upper treatment device 100 may be disposed over the lower treatment device 200, and a top surface of the lower treatment device 200 may be covered by the upper treatment device 100.

The tub 220 may be formed in a cylindrical shape that is movable by a suspension 222 such as a spring or a damper, and may be formed in the lower cabinet 210. A tub heater 225 for heating wash water stored in the tub 220 may be provided at an inner lower portion of the tub 220.

In this case, a tub opening 221 communicating with the lower inlet 212 formed at the lower front panel 211 may be formed in front of the tub 220. Here, the lower inlet 212 and the tub opening 221 of the lower front panel 211 may further include a bellows-shaped gasket 223 for maintaining water-tightness during movement of the tub 220.

The lower driver 230 may be provided at the rear surface of the tub 220 to rotate the washing drum 240. The lower driver 230 may include an outer-rotor-type motor 232 provided at the rear surface of the tub 220, and a rotary shaft 231 configured to penetrate the rear surface of the tub 220 to transmit the rotational force of the motor 232.

The washing drum 240 may be formed in a cylindrical shape that is rotatably provided in the tub 220 by connecting to the rotary shaft 231. The washing drum 240 may be provided with a drum opening 241 communicating with the tub opening 221 formed in the tub 220 in which laundry is put and disposed. In addition, a plurality of dehydration holes 242 for movement of wash water and a plurality of lifters 243 may be provided at the inner circumferential surface of the wash drum 240.

The water supply unit 250 may receive wash water from an external water supply source (not shown) located outside the laundry treatment device 10. The water supply unit 250 may include a water supply pipe 251 connected to the external water supply source, a detergent supply unit 252 configured to mix wash water and detergent by connecting to the water supply pipe 251 and to supply a mixture of the wash water and the detergent to the tub 220, and a supply hose 253 configured to interconnect the detergent supply unit 252 and the tub 220.

The lower drain unit 260 may be disposed below the tub 220 to discharge wash water used to wash laundry to the outside of the tub 220. The lower drain unit 260 may include a drain hose 261 connected to a lower bottom surface of the tub 220, a drain pump 262 included in the drain hose 261 to pump wash water, and a drain pipe 253 to discharge wash water pumped by the drain pump 262 to the outside of the lower treatment device 200.

The above-described laundry treatment apparatus 10 may be configured in a manner that the upper treatment device 100 and the lower treatment device 200 are disposed in a vertical direction, and may be controlled by only one control panel 300 to implement a sense of unity in design.

The control panel 300 may be disposed at a front lower surface of the upper treatment device 100 or at a front upper surface of the lower treatment device 200. For convenience of description, the following embodiment will hereinafter be described with reference to one example in which the control panel 300 is disposed at a lower portion of the upper treatment device 100.

The control panel 300 may be disposed below the upper front panel 111. The control panel 300 may include an upper operation unit 314 to control the upper treatment device 100, an upper display 315 to display an operation state of the upper treatment device 100, a lower operation unit 324 to control the lower treatment device 200, and a lower display 325 to display an operation state of the lower treatment device 200.

In addition, the upper treatment device 100 may include an upper controller 172, and the lower treatment device 200 may include a lower controller 272. The upper controller 172 and the lower controller 272 may be provided to communicate with each other, so that the lower treatment device 200 (or the upper treatment device 100) may interact with the upper treatment device 100 (or the lower treatment device 200) according to operation of the upper treatment device 100 (or the lower treatment device 200).

That is, the upper controller 172 and the lower controller 272 may be electrically connected to each other. As a result, when the upper treatment device 100 and the lower treatment device 200 are operated, the upper controller 172 and the lower controller 272 can determine whether their counterpart treatment devices operate or not. The operations of the upper treatment device 100 and the lower treatment device 200 can be controlled and changed according to whether their counterpart treatment device operates or not.

On the other hand, each of the upper treatment device 100 and the lower treatment device 200 may receive a power-supply voltage from the external power source (P) using a power line (not shown). In this case, the user should connect the upper treatment device 100 and the lower treatment device 200 to the external power source using separate power lines, resulting in occurrence of user inconvenience and having an adverse effect on aesthetics.

As can be seen from FIG. 3, the upper treatment device 100 and the lower treatment device 200 may be connected to each other using only one main power line (P1). The upper power line 171 and the lower power line 271 may be branched from the main power line (P1), so that the upper treatment device 100 and the lower treatment device 200 can be simultaneously powered on.

Here, the main power line (P1) may be selectively connected to the upper treatment device 100 or the lower treatment device 200. The main power line (P1) may be branched from any one of the upper treatment device 100 and the lower treatment device 200 that are stacked, so that the remaining lower treatment device 200 or the remaining upper treatment device 100 can be powered on.

On the other hand, the upper treatment device 100 includes an upper power-supply controller 170, and the lower treatment device 200 includes a lower power-supply controller 270, so that AC power supplied to the upper power line 171 and the lower power line 271 through the main power line can be converted into DC power that can be used in the upper treatment device 100 and the lower treatment device 200.

In this case, DC power converted by the upper power-supply controller 170 may be selectively supplied to constituent elements (scheduled to use DC power) of the upper treatment device 100 by the upper controller 172 of the upper treatment device 100. For example, DC power converted by the upper power-supply controller 170 may be provided to the upper driver 140, the heat exchanger 150, and the steam generator 190 under control of the upper controller 172, such that the upper treatment device 100 can be turned on or off or can be quantitatively controlled.

In addition, DC power converted by the lower power-supply controller 270 may be selectively supplied to constituent elements (scheduled to use DC power) of the lower treatment device 200 by the lower controller 272 of the lower treatment device 200. For example, DC power converted by the lower power-supply controller 270 may be provided to the lower driver 230 and a tub heater 225 under control of the upper controller 272, such that the lower treatment device 200 can be turned on or off or can be quantitatively controlled.

On the other hand, the lower treatment device 100 and the lower treatment device 200 may be configured to simultaneously receive power from the external power source (P) through one main power line (P1). Power supplied to the main power line (P1) can be simultaneously supplied to the upper treatment device 100 and the lower treatment device 200 through the upper power line 171 and the lower power line 271.

A method for operating the laundry treatment apparatus 10 according to the present disclosure will hereinafter be described with reference to FIG. 4.

When the external power source (P) is connected to the laundry treatment apparatus 10 through the main power line (P1), the upper treatment device 100 may receive power from the external power source (P) through the main power line (P1) and the upper power line 171 (S110), the lower treatment device 200 may receive power from the external power source (P) through the main power line (P1) and the upper power line 271 (S210), so that each of the upper treatment device 100 and the lower treatment device 200 may start operation.

On the other hand, the laundry treatment apparatus 10 may be classified into the upper treatment device 100 serving as the drying machine and the lower treatment device 200 serving as the washing machine. For convenience of description, operation of the upper treatment device 100 and operation of the lower treatment device 200 are distinguished from each other and will hereinafter be described in different ways.

The operation of the lower treatment device 200 will hereinafter be described with reference to FIG. 4. In this case, the lower treatment device 200 may be implemented as a washing machine or a drying machine. For convenience of description, the present disclosure will hereinafter be described with reference to one example in which the lower treatment device 200 is implemented as a washing machine.

Since the main power line (P1) is connected to the external power source (P), the lower treatment device 200 may receive power through the lower power line 271 (S110). Here, the lower controller 272 of the lower treatment device 200 may wait for the user to input an operation command and to select a washing course (S120).

In this case, the user may select and input a washing course or the like of the lower treatment device 200 through the lower operation unit 324 provided in the lower controller 320 of the control panel 300 of the laundry treatment apparatus 10. In this case, when the user has not yet input a desired washing course to the lower controller 272, the lower controller 272 may wait to receive user input.

On the other hand, when the user selects and inputs a desired washing course to the lower treatment device 200, the lower controller 272 may detect the amount of laundry placed in the lower treatment device 200 (S140). Here, the amount of laundry may be used as basic information for performing the washing course to be selected by the user. The amount of water supplied in the water supply step forming the washing course, a washing (rinsing) time of the washing (rinsing) step, and dehydration times of the dehydration step can vary depending on the amount of laundry to be washed.

Thereafter, the lower controller 272 may determine (or set) the operation condition for each step constituting the washing course in addition to the laundry amount condition, according to the operation states of the upper treatment device 100 and according to whether the upper treatment device 100 starts operation (S150).

Here, the step (S150) of determining the washing course according to the operation states of the upper treatment device 100 may be classified into a first step (S151) for determining whether the upper treatment device 100 starts operation and a second step (S160) for determining a washing course by changing the detailed setting of the washing course according to the operation states of the upper treatment device 100.

The step (S151) of determining the operation of the upper treatment device 100 may be classified into a first step (See FIG. 5) that is changed according to the operation states of the upper treatment device 100 regardless of the progress of the drying course, and a second step (see FIGS. 6 and 7) for setting the washing course according to the progress of the drying course of the upper treatment device 100.

First, a method for setting the washing course according to the operation of the upper treatment device 100 will hereinafter be described with reference to FIG. 5.

Figure 5:
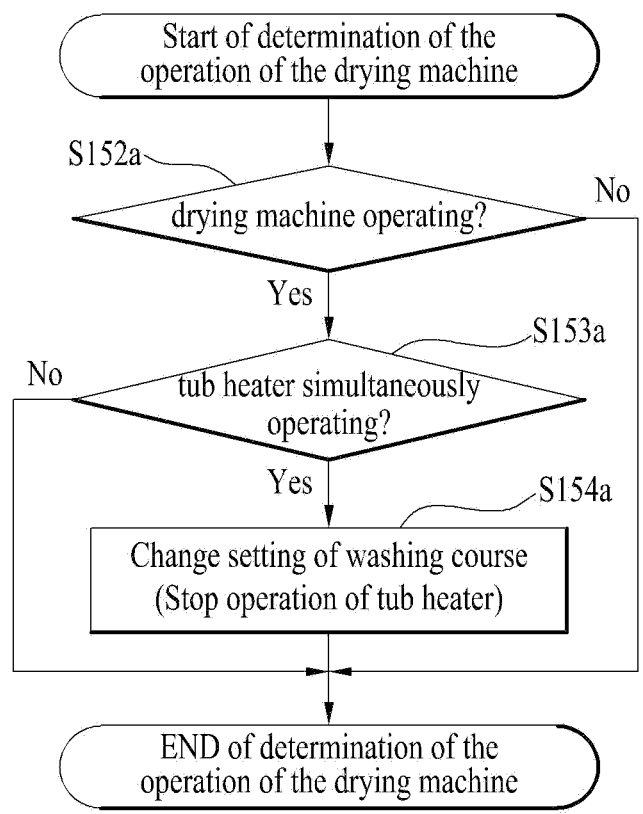
FIGS. 5 to 7 are flowcharts illustrating methods for determining operations of a drying machine according to an embodiment of the present disclosure.

As shown in FIG. 5, prior to operation of the lower treatment device 200, the lower controller 272 may determine whether to operate the upper treatment device 100, and may determine whether to operate the tub heater 225 for heating wash water in the washing course of the lower treatment device 200 according to the operation states of the upper treatment device 100.

That is, when the lower treatment device 200 starts operation simultaneously with the operation (the progress of a drying course) of the upper treatment device 100 and the tub heater 225 of the lower treatment device 200 heats wash water, total current consumption of the upper treatment device 100 and the lower treatment device 200 may exceed an allowable current value for each house.

Therefore, when the upper treatment device 100 starts operation (the progress of a drying course) simultaneously with the operation of the lower treatment device 200 (the progress of a washing course), the washing course of the lower treatment device 200 can be corrected (or changed) and established in a manner that current consumption of the lower treatment device 200 can be reduced and the lower treatment device 200 can operate within the allowable current value for each household.

Specifically, the lower controller 272 may determine whether the upper treatment device 100 operates, and may determine whether the drying course of the upper treatment device 100 and the washing course of the lower treatment device 200 are performed in an overlapping manner (S152a).

Here, when the lower controller determines that the drying course of the upper treatment device 100 and the washing course of the lower treatment device 200 do not overlap each other in operation, the lower controller may set a general washing course without changing the washing course setting (S160), thereby operating the lower treatment device 200.

In contrast, when the lower controller 272 determines that the drying course of the upper treatment device 100 and the washing course of the lower treatment device 200 overlap each other in operation, the lower controller 272 may determine whether the drying course of the upper treatment device 100 and the operation of using the tub heater 225 during the washing course of the lower treatment device 200 are simultaneously performed (S153a).

In this case, if it is determined that the operation of using the tub heater 225 in the washing course of the lower treatment device 200 and the drying course of the upper treatment device 100 do not overlap each other in operation, the lower controller 272 may set a general washing course without changing the washing course of the lower treatment device 200 so that the lower treatment device 200 can operate.

In contrast, if it is determined that the operation of using the tub heater 225 and the drying course of the upper treatment device 100 are performed in an overlapping manner during the washing course of the lower treatment device 200, the washing course may be set in a state excluding the use of the tub heater 225 during the washing course of the lower treatment device 200, so that the washing course can be performed (S154a).

That is, when the operation of the upper treatment device 100 (the progress of a drying course) and the operation (the progress of a washing course) of the lower treatment device 200 are simultaneously performed, the use of the tub heater 225 is excluded during the washing course of the lower treatment device 200, and the washing course of the lower treatment device 200 can be corrected (or changed) and established in a manner that current consumption of the lower treatment device 200 can be reduced and the lower treatment device 200 can operate within the allowable current value for each household.

Therefore, as described above, when the washing course of the lower treatment device 200 and the drying course of the upper treatment device 100 are simultaneously performed, the use of the tub heater 225 in the washing course of the lower treatment device 200 is stopped during the washing course of the lower treatment device 200 so that current consumption of the lower treatment device 200 and the upper treatment device 100 may be determined not to exceed the maximum allowable current value for each household.

A method for setting the washing course of the lower treatment device 200 according to progress of the drying course of the upper treatment device 100 will hereinafter be described with reference to FIG. 6.

Figure 6:
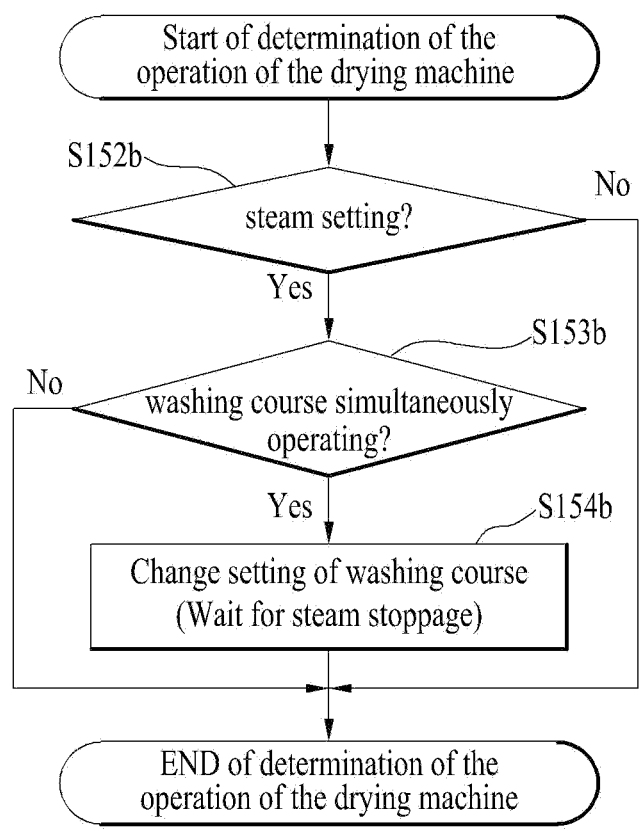

As illustrated in FIG. 6, prior to operation of the lower treatment device 200, the lower controller 272 may determine whether to set (or establish) the drying course of the upper treatment device 100, and may determine whether to perform the washing course of the lower treatment device 200 according to the setting of the drying course of the upper treatment device 100.

That is, in a situation where operation of the steam generator 190 is included in the drying course of the upper treatment device 100 during operation of the upper treatment device 100, if the upper treatment device 100 and the lower treatment device 200 are simultaneously operated, total current consumption of the upper treatment device 100 and the lower treatment device 200 may exceed the allowable current value for each household.

Therefore, during operation of the upper treatment device 100, when the drying course includes the operation of the steam generator 190 and is performed simultaneously with activation of the lower treatment device 200 in an overlapping manner, the washing course of the lower treatment device 200 starts operation after staying in a standby mode until the steam generator 190 of the upper treatment device 100 starts operation, so that the washing course of the lower treatment device 200 can be corrected (or changed) and established in a manner that the lower treatment device 200 can operate within the allowable current value for each household.

Specifically, the lower controller 272 may determine whether the upper treatment device operates or not, and may determine whether the operation of the steam generator 190 is included in the drying course of the upper treatment device 100 (S152b).

In this case, when the operation of the steam generator 190 is not included in the drying course of the upper treatment device 100, the lower controller 272 may set a general washing course without changing the setting of the washing course of the lower treatment device 200 (S160), thereby operating the lower treatment device 200.

On the other hand, when the operation of the steam generator 190 is included in the drying course of the upper treatment device 100, the lower controller 272 may determine whether the operation of the steam generator for use in the drying course of the upper treatment device 100 and the washing course of the lower treatment device 200 are performed in an overlapping manner (S153*b*).

In this case, if it is determined that the operation of the steam generator 190 and the washing course of the lower treatment device 200 are not performed in an overlapping manner during the drying course of the upper treatment device 100, the lower controller 272 may set a general washing course without changing the setting of the washing course of the lower treatment device 200 (S160), thereby operating the lower treatment device 200.

On the other hand, if it is determined that the operation of the steam generator 190 and the washing course of the lower treatment device 200 are performed in an overlapping manner during execution of the drying course of the upper treatment device 100, the lower controller 272 changes the start time point of the washing course of the lower treatment device 200 to another time point after the operation of the steam generator 190 is finished during the drying course of the upper treatment device 100, sets the changed washing course, and operates the lower treatment device 200 in the set washing course (S154*b*).

In other words, if it is determined that the operation of the steam generator 190 and the washing course of the lower treatment device 200 are performed in an overlapping manner during the drying course of the upper treatment device 100, the lower controller 272 changes the start time point of the washing course of the lower treatment device 200 to another time point located after the end point of the operation of the steam generator 190 during the drying course of the upper treatment device 100, so that the washing course of the lower treatment device 200 can be changed and set in a manner that current consumption of the lower treatment device 200 can be reduced and the lower treatment device 200 can thus operate within the allowable current value for each household.

Therefore, as described above, in a situation where the washing course of the lower treatment device 200 and the drying course of the upper treatment device 100 are simultaneously performed, if the operation of the steam generator 190 of the upper treatment device 100 and the washing course of the lower treatment device 200 are performed in an overlapping manner, the start time point of the washing course of the lower treatment device 200 may be delayed until the steam generator 190 stops operation, so that current consumption of the lower treatment device 200 and the upper treatment device 100 may be configured not to exceed the maximum allowable value for each household.

Another setting of the washing course of the lower treatment device 200 according to a method for performing the drying course of the upper treatment device 100 will hereinafter be described with reference to FIG. 7.

Figure 7:
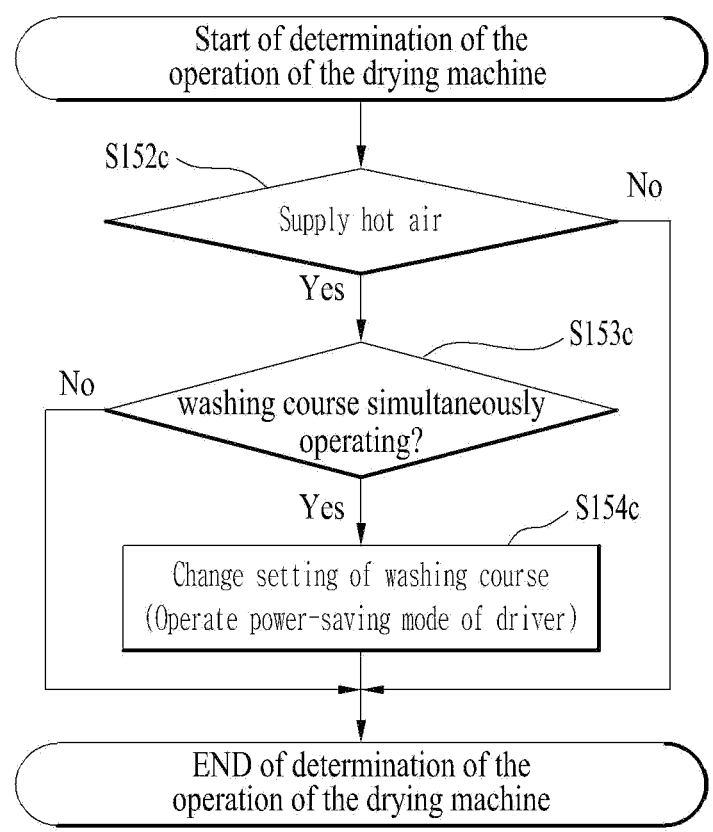

As shown in FIG. 7, prior to operation of the lower treatment device 200, the lower controller 272 may determine setting of the drying course of the upper treatment device 100, and may control a method for operating the lower driver 230 from among the washing course of the lower treatment device 200 according to execution of the drying course of the upper treatment device 100.

That is, in order to perform the drying course of the upper treatment device 100 as well as to perform the drying course of the upper treatment device 100 during operation of the upper treatment device 100, the heat exchanger 150 can start operation and the lower driver 230 can perform the washing course of the lower treatment device 200. In this case, total current consumption of the upper treatment device 100 and the lower treatment device 200 can exceed the allowable current value for each household.

Therefore, when the washing course of the lower treatment device 200 is performed to overlap with the drying course of the upper treatment device 100, the operation of the lower driver 230 of the lower treatment device 200 is controlled in a manner that current consumption of the upper treatment device 100 and the lower treatment device 200 is within the allowable current value for each household. In this way, the operation of the lower driver 230 of the lower treatment device 200 can be changed and set as described above.

Specifically, in order for the upper treatment device 100 to perform the drying course by determining whether or not the upper treatment device 100 operates, the lower controller 272 can determine whether the heat exchanger 150 is operating or not (S152*c*).

Here, when the drying course of the upper treatment device 100 is underway or when the heat exchanger 150 is not operated, the lower controller 272 may set a general washing course without changing the setting of the washing course of the lower treatment device 200 (S160), and may operate the lower treatment device 200 in the set washing course.

In contrast, when the heat exchanger 150 is operating during execution of the drying course of the upper treatment device 100, the lower controller 272 may determine whether the operation time point of the heat exchanger is performed to overlap with the washing course of the lower treatment device 200 (S153*c*).

In this case, if it is determined that the operation time of the heat exchanger 150 and the washing course of the lower treatment device 200 do not overlap each other during the drying course of the upper treatment device 100, a general washing course may be established without changing the setting of the washing course of the lower treatment device 200, so that the lower treatment device 200 can operate in the washing course.

In contrast, if it is determined that the operation time of the heat exchanger 150 and the washing course of the lower treatment device 200 are performed in an overlapping manner during the drying course of the upper treatment device 100, the lower controller 272 may control the lower driver 230 that performs the washing course of the lower treatment device 200 (S154*c*).

Specifically, the lower controller 272 may change a current washing course to another washing course in a manner that driving efficiency of the lower driver 230 can be reduced in the washing (rinsing) step of the washing course during execution of the washing course. Thereafter, the lower treatment device 200 can operate in the changed washing course.

In other words, if it is determined that the washing course of the lower treatment device 200 and the drying course of the upper treatment device 100 are performed in an overlapping manner, the lower treatment device 200 may be controlled in a manner that driving efficiency of the lower driver can be reduced and current consumption of the lower treatment device 200 can also be reduced, and the washing course of the lower treatment device 200 may be changed to another washing course in a manner that the lower treatment device 200 can operate within the allowable current value for each house, so that the changed washing course can be set and established.

Therefore, in a situation where the washing course of the lower treatment device 200 and the drying course of the upper treatment device 100 are simultaneously performed, if the drying course of the upper treatment device 100 and the washing course of the lower treatment device 200 are performed in an overlapping manner, the lower driver of the lower treatment device 200 is controlled in a manner that current consumption of the upper treatment device 100 and the lower treatment device 200 does not exceed the maximum allowable current value for each housel.

Figure 4:
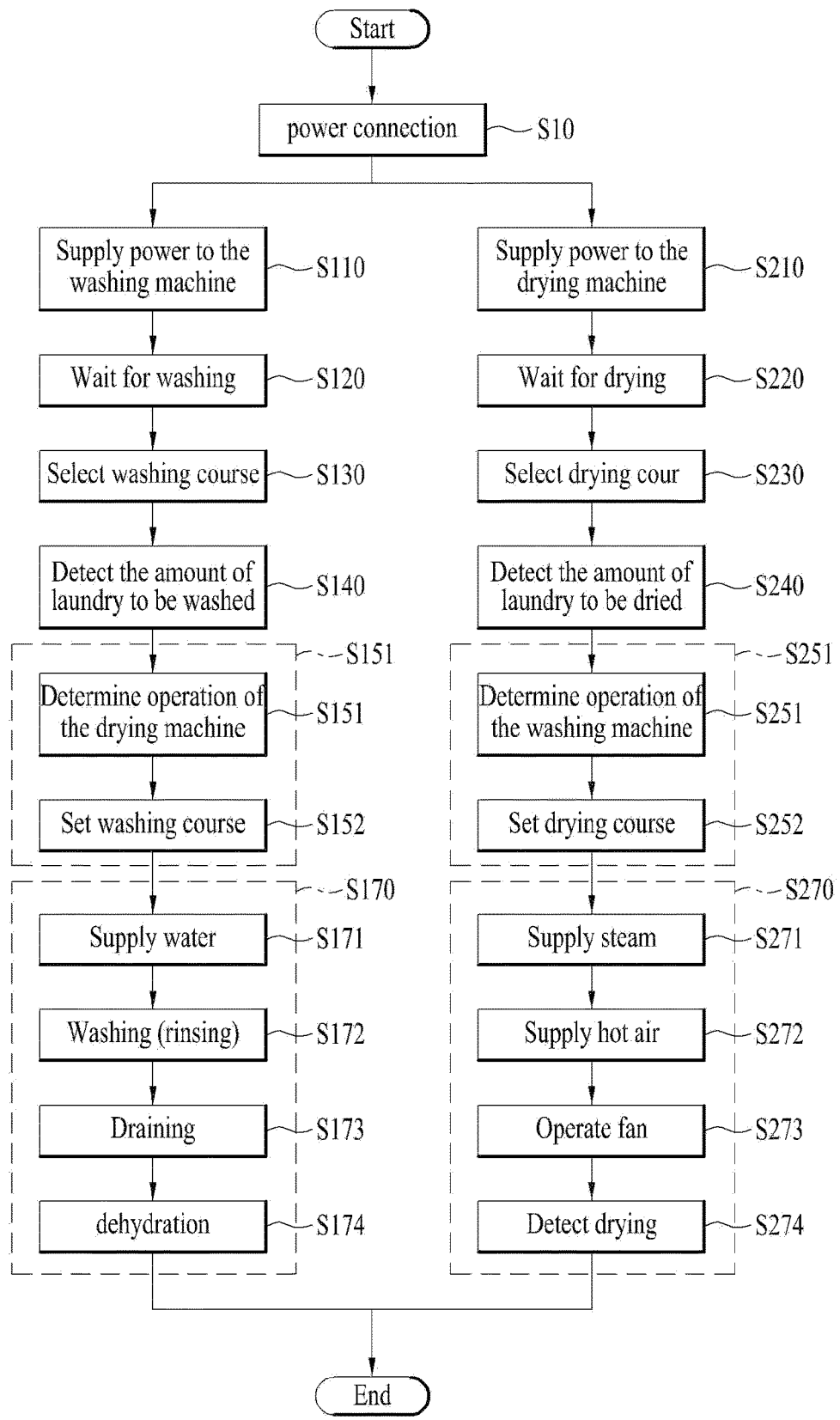
FIG. 4 is a flowchart illustrating a method for operating the laundry treatment apparatus according to an embodiment of the present disclosure.

On the other hand, as described above, when the washing course of the lower treatment device 200 is completely configured according to a method for determining the operation of the upper treatment device 100 by the lower controller 272, the lower controller 272 may sequentially perform the water supply step S171, the washing (rinsing) step S172, the draining step S173, and the dehydration step S174 according to the washing course established as shown in FIG. 4.

In this case, the additional water supply step (not shown) and the draining step (not shown) may be further provided between the respective steps of the washing course, and as such a detailed description thereof will herein be omitted for convenience of description.

In contrast, during execution of the washing course, when the operation of the steam generator 190 and the washing course are performed in an overlapping manner during the drying course of the upper treatment device 100 as described above, the washing course may be performed after operation of the steam generator 190 of the upper treatment device 100 has been completed.

On the other hand, in the water supply step S171, the water supply unit 350 starts operation according to the amount of laundry detected in the above-described laundry amount sensing step S140, so that wash water can be supplied into the tub 220 and the supplied water can be stored in the tub 220.

In this case, in the water supply step S171 or the washing (rinsing) step S172, the wash water stored in the tub 220 may be heated by the tub heater 225 so as to increase washing performance of laundry, and the washing (rinsing) step S172 may be performed using the heated water.

On the other hand, during execution of the above-described wash supply step S171 and the washing (rinsing) step S172, the drying course of the upper treatment device 100 and the operation of the tub heater 225 are performed in an overlapping manner as described above, the washing (or rinsing) step S172 may be performed without using the tub heater 225.

In the washing (rinsing) step S172, the washing drum 240 may rotate in forward and backward directions according to the operation of the lower driver 230, laundry placed in the washing drum 240 may move and tumble so that the laundry can be washed and contaminants remaining in the laundry can be removed.

In contrast, in the washing (rinsing) step S172, when the heat exchanger 150 starts operation in a manner that the drying course is performed by the upper treatment device 100, the operation of the lower driver 230 can be controlled. In this case, the lower driver 230 may be controlled in a manner that the sum of current consumption of the upper treatment device 100 and current consumption of the lower treatment device 200 does not exceed the allowable current value for each household.

In contrast, the washing (rinsing) step may be performed in a manner that a washing cycle and a rinsing cycle can be performed separately from each other, so that the washing cycle and the rinsing cycle can be performed by rotation of the tub 220 according to the operation of the lower driver 230.

In the dehydration step S174, the washing drum 240 may rotate at a high speed according to the operation of the lower driver 230, so that wash water remaining in the rinsed laundry can be dehydrated.

In this case, the washing course may include various kinds of washing courses according to a combination of the water supply step S171, the washing (rinsing) step S172, the dehydration step S174, etc. Such washing course can be implemented as various washing courses, and as such a detailed description thereof will herein be omitted for convenience of description.

The method for operating the upper treatment device 100 will hereinafter be described with reference to FIG. 4. Here, the upper treatment device 100 can be implemented as a drying machine or a washing machine. For convenience of description, the following embodiment will hereinafter be described with reference to one example in which the upper treatment device 100 is implemented as the drying machine.

Since the main power line (P1) is connected to the external power source (P), the upper treatment device 100 may receive power through the upper power line 171 (S210). In this case, the upper controller 172 of the upper treatment device 100 may wait for the user to input an operation command and to select a desired drying course (S220).

In this case, the user may select and input a drying course, etc. of the upper treatment device 100 through the upper operation unit 314 mounted to the upper controller 310 of the control panel 300 of the laundry treatment apparatus 10 (S230). In this case, the upper controller 172 may wait for the user input in a situation where the drying course is not input by the user.

Here, the upper treatment device 100 may include various drying courses for drying various types of laundry in the same manner as in the lower treatment device 200, so that various drying courses are implemented in a manner that the steam supply, the rotation speed of the drying drum, and air temperature are adjusted in different ways. The drying course can be implemented in various ways, and as such a detailed description thereof will herein be omitted for convenience of description.

On the other hand, if the user selects and inputs a desired drying course, the upper controller 172 may sense the amount of laundry placed in the upper treatment device 100 (S240). Here, the amount of laundry may be used as basic information for performing the drying course to be selected by the user, and the steam supply, the temperature of hot water, and the drying times can be changed according to the amount of laundry.

Thereafter, in addition to the laundry amount condition indicating the amount of laundry, the upper controller 172 may set and establish the operation conditions of the respective steps constituting the drying course according to the progress of the washing course of the lower treatment device 200 (S250).

In this case, the setting step (S250) of the drying course according to the operation states of the lower treatment device 200 may be classified into the step S251 for determining the operation states of the lower treatment device 200 and the other step S260 for setting (or establishing) the washing course by changing the condition of the drying course to another condition according to the operation states of the lower treatment device 200.

The step S251 for determining the operation state of the lower treatment device 200 may include changing the setting (see FIG. 8) of the drying course according to the progress of the drying step S174 during the washing course of the lower treatment device 200.

Thereafter, a method for setting the drying course of the upper treatment device according to operation states of the washing course of the lower treatment device 200 will hereinafter be described with reference to FIG. 8.

Figure 8:
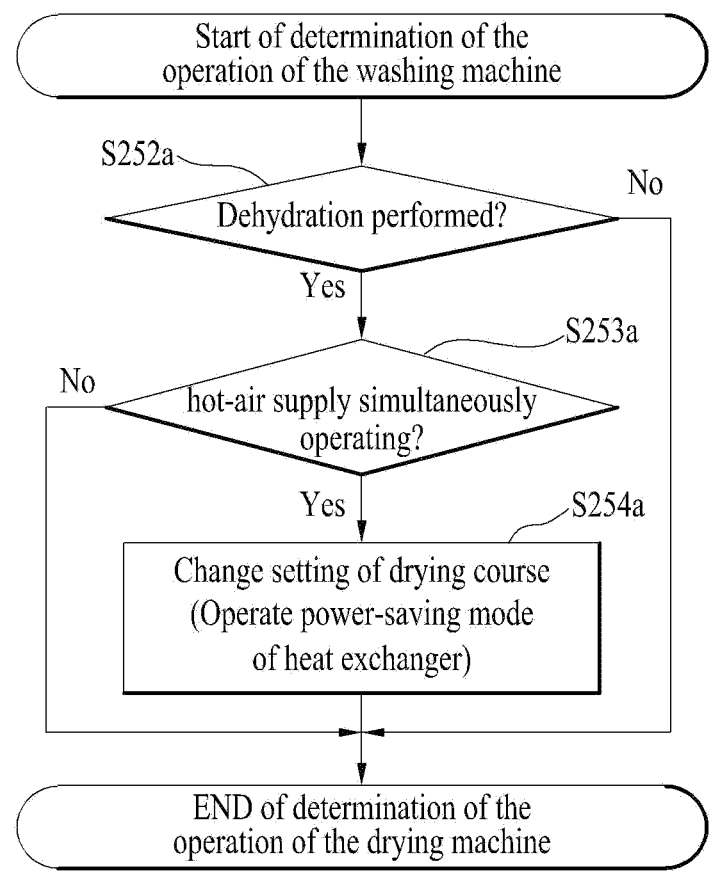
FIG. 8 is a flowchart illustrating a method for determining operations of a washing machine according to an embodiment of the present disclosure.

As shown in FIG. 8, the upper controller 172 may determine the setting state of the washing course of the lower treatment device 200 prior to operation of the upper treatment device 100, and may control the operation of the heat exchanger 150 of the upper treatment device 100 according to the progress of the washing course of the lower treatment device 200.

That is, in order for the lower treatment device 200 to perform the dehydration step S174 during execution of the washing course, when the heat exchanger 150 for enabling the upper treatment device 100 to perform the drying course operates together with the lower driver 230, total current consumption of the upper treatment device 100 and the lower treatment device 200 can exceed the allowable current value for each household.

Therefore, when the drying course of the upper treatment device 100 is performed to overlap with the washing course of the lower treatment device 200, the operation of the heat exchanger 150 is controlled in a manner that current consumption of the upper treatment device 100 and the lower treatment device 100 can be within the allowable current value for each house, the operation of the heat exchanger 150 of the upper treatment device 100 may be changed and set (or established).

Specifically, the upper controller 172 may determine whether the lower treatment device 200 operates, and may determine whether the lower driver 230 operates such that the lower treatment device 200 can perform the dehydration step (S174) during execution of the washing course (S252a).

In this case, when the lower treatment device 200 performs the washing course or the dehydration step S174 is not performed, the upper controller 172 may set a general dehydration course without changing the setting of the dehydration course of the upper treatment device 100, such that the upper treatment device 100 can start operation in the dehydration course.

On the other hand, during execution of the washing course of the lower treatment device, the upper controller 172 may determine whether the operation time of the heat exchanger 150 of the upper treatment device 100 and the dehydration step from among the washing course of the lower treatment device 200 are performed in an overlapping manner (S253c).

In this case, if it is determined that the dehydration step S174 from among the washing course of the lower treatment device 200 and the operation of the heat exchanger 150 of the upper treatment device 100 do not overlap each other, the upper controller 172 may set (or establish) a normal drying course without changing the setting of the drying course of the upper treatment device 100 (S260), so that the upper treatment device 100 can operate.

On the other hand, if it is determined that the dehydration step S174 from among the washing course of the lower treatment device 200 and the operation of the heat exchanger 150 from among the drying course of the upper treatment device 100 are performed in an overlapping manner, the upper controller 172 may switch the operation of the heat exchanger 150 to a power-saving drying course during the drying course of the upper treatment device 100, and may thus perform the drying course in the power-saving drying course (S254a).

In addition, when the lower treatment device 200 and the upper treatment device 100 are simultaneously operated, the upper controller 172 may determine whether the dehydration step S174 is performed during the washing course of the lower treatment device 200.

In this case, the upper controller 172 may determine whether the lower treatment device 200 operates (S251), and may perform a normal drying course and a power-saving drying course according to whether the dehydration step S174 of the washing course of the lower treatment device 200 is performed.

That is, the upper controller 172 may determine whether the lower treatment device 200 operates (S251), and may determine whether the dehydration step S174 is performed during execution of the washing course. In a situation where the lower treatment device 200 does not operate or stays in the standby mode, when the remaining steps other than the dehydration step (S174) are performed in the washing course of the lower treatment device 200, the normal drying course can be performed.

However, when the lower treatment device 200 is in operation and the dehydration step (S174) from among the washing course is performed by the operation state of the lower treatment device 200, the upper controller 172 may change the drying course to the power-saving drying course, and may perform drying of laundry.

On the other hand, the above-described normal drying course and the power-saving drying course may be different from each other in terms of operation of the compressor 153 of the heat exchanger 150. That is, the normal drying course may be activated in a manner that the compressor 153 can discharge a general rated heat capacity. The power-saving drying course may be activated in a manner that the compressor 153 can discharge less heat capacity than the rated heat capacity. In this case, the amount of heat capacity discharged from the compressor 153 in the power-saving drying course may be about half of heat capacity discharged from the compressor 153 in the normal drying course.

That is, if it is determined that the dehydration step S174 of the washing course of the lower treatment device 200 and the drying course of the upper treatment device 100 are performed in an overlapping manner, the operation of the heat exchanger 150 of the upper treatment device 100 is controlled to reduce current consumption of the upper treatment device 100 so that the upper treatment device 100 can operate within the allowable current value for each house, and the drying course of the upper treatment device 1200 can be changed to another course and the changed course is then established.

Therefore, in a situation where the drying course of the upper treatment device 100 and the washing course of the lower treatment device 200 are simultaneously performed as described above, when the operation of the heat exchanger 150 of the upper treatment device 100 and the dehydration step from among the washing course of the lower treatment device 200 are performed in an overlapping manner, the heat exchanger 150 of the upper treatment device 100 is controlled so that the amount of current used in the lower treatment device 200 and the upper treatment device 100 does not exceed the maximum allowable current value for each household.

On the other hand, when the drying course of the upper treatment device 100 is completely established according to how the upper controller 172 determines the operation state of the lower treatment device 200, the upper controller 172 may sequentially perform the steam supply step (S271), the hot air supply step (S272), the fan operation step (S273), and the dryness sensing step (S274) according to the drying course established as shown in FIG. 4.

Here, the normal drying course and the power-saving drying course may equally include the steam supply step (S271), the hot air supply step (S272), the fan operation step (S273), and the dryness sensing step (S274). In the hot air supply step (S272), there is a difference in heat capacity and operation time that are generated by the compressor 153 of the heat exchanger 150.

Specifically, the steam supply step (S271) may include heating water to be supplied to the steam generator 190, and supplying the heated water to the drying drum 120. In contrast, when the steam supply step (S271) is performed by the upper treatment device 100, the lower treatment device 200 to be used for the washing course may be in a standby mode until the steam supply (S271) is ended, and may then perform the washing course after completion of the steam supply step (S271).

The hot air supply step (S272) may be activated such that the compressor 153 of the heat exchanger 150 can discharge the heat capacity configured in each of the heat absorption unit 151 and the heating unit 152. In this case, the compressor 153 of the heat exchanger 150 may be controlled in a manner that the rated heat capacity can be discharged outside in the normal drying course according to setting of the upper controller 172. When the operation of the compressor 153 of the heat exchanger 150 and the dehydration step (S174) of the lower treatment device 200 are performed in an overlapping manner, less heat capacity than the rated heat capacity can be discharged outside in the power-saving drying course.

On the other hand, the fan operation step (S273) may enable circulation of the air of the circulation passage unit 130 so that the dried and heated air from the heat absorption unit 151 and the heating unit 152 can flow into the drying drum 120. The dryness sensing step (S274) may determine whether laundry to be dried in the drying drum 120 is dry or not.

In this case, in each of the hot air supply step (S272), the fan operation step (S273), and the dryness sensing step (S274), the drying drum 120 may rotate at a constant speed by operation of the upper driver 140, so that laundry placed in the drying drum 120 can be in contact with the air that is heated by the heat exchanger 150 and moves by the circulation passage unit 130.

In addition, when drying of laundry is not completed in the dryness sensing step (S274), the above-described hot air supply step (S272) and the fan operation step (S273) are repeated/continued to proceed with drying of laundry. Thus, if laundry drying is completed in the dryness sensing step (S274), the drying course can be ended.

In this case, when the power-saving drying course is performed, a compensation time addition step (not shown) in addition to the hot air supply step (S272), the fan operation step (S273), and the dryness sensing step (S274) may be further included in the power-saving drying course. That is, the hot air supply step (S272) for use in the power-saving drying course may be activated in a manner that the compressor 153 of the heat exchanger 150 can discharge less heat capacity than a heat capacity predetermined in each of the heat absorption unit 151 and the heating unit 152.

Here, when the dehydration step S174 is performed by the lower treatment device 200, the hot air supply step for use in the power-saving drying course may prevent power consumption of the lower driver 230 required when the lower treatment device 200 performs the dehydration step (S174) from exceeding the rated current of the external power source (P) installed in each house. In addition, the hot air supply step for use in the power-saving drying course may prevent power consumption of the heat exchanger 150 required when the upper treatment device 100 performs the general dehydration course from exceeding the rated current of the external power source (P) installed in each house.

That is, in a situation where the lower treatment device 200 performs the dehydration step (S174) of the washing course, when the upper treatment device 100 performs the normal drying course, overload may occur in the external power source (P), so that the external power (P) can be blocked. Therefore, according to whether the lower treatment device 200 is activated during the operation of the upper treatment device 100, there is a need to control current consumption of the upper treatment device 100.

On the other hand, heat capacity generated by the heat exchanger 150 in the power-saving drying course may be smaller than heat capacity generated by the heat exchanger 150 in the normal drying course. Preferably, heat capacity generated by the heat exchanger 150 in the power-saving drying course may be about half of the heat capacity generated by the heat exchanger 150 in the normal drying course.

On the other hand, the running time of the power-saving drying course may be longer than the running time of the normal drying course. That is, heat capacity generated in the operation of the heat exchanger 150 in the power-saving drying course may be less than heat capacity generated in the operation of the heat exchanger 150 in the normal drying course, and the temperature of air required to dry laundry may decrease.

Therefore, it is preferable that the running time of the power-saving drying course to be lengthened for laundry drying. That is, the drying time for use in the power-saving drying course may be longer than the drying time for use in the normal drying course.

In this case, the addition of a compensation time of the power-saving drying course may correspond to the total amount of heat capacity generated by the heat exchanger 150 and heat capacity caused by the drying time. That is, in the power-saving drying course, as heat capacity generated by the heat exchanger 150 decreases as compared to the normal drying course, the drying time of the power-saving drying course may relatively increase to compensate for less heat capacity.

Specifically, the drying time for use in the power-saving drying course may be defined as an increase in time according to an overlap between the dehydration step (S174) of the lower treatment device 200 and the power-saving drying course of the upper treatment device 100. That is, when heat capacity corresponding to half of the normal drying course occurs in the power-saving drying course, as the dehydration step (S174) of the lower treatment device 200 is performed, the drying time may additionally increase by a predetermined time in which the upper treatment device 100 performs the power-saving drying course.

For example, as the dehydration step (S174) of the lower treatment device 200 is underway, the upper treatment device 100 transitions from the normal drying course to the power-saving drying course, and the heat exchanger performs the power-saving drying course during a first time. In this case, the upper controller 172 may add the first time to the normal drying course time, so that the power-saving drying course can be additionally performed during the sum of the first time and the normal drying course time.

In this case, although the above-described embodiment in which heat capacity generated by the heat exchanger 150 in the power-saving drying course occurs as much as half of the heat capacity generated by the heat exchanger 150 in the normal drying course has been disclosed as an example for convenience of description, other implementations are also possible. When heat capacity generated by the heat exchanger in the power-saving drying course is less than half of the heat capacity generated by the heat exchanger 150 in the normal drying course, the added drying time may increase in inverse proportion to heat capacity generated by the heat exchanger 150 in the power-saving drying course.

On the other hand, the dryness sensing step (S274) may include determining the degree of dryness of laundry dried in the normal drying course or the power-saving drying course. When drying of laundry is not completed, the hot air supply step (S272) and the fan operation step (S273) are repeated/continued to perform drying of laundry. When drying of laundry is completed in the dryness sensing step (S274), the normal drying course or the power-saving drying course can be ended.

According to the above-described method for controlling the laundry treatment apparatus, when the washing course of the lower treatment device 200 and the drying course of the upper treatment device 100 are simultaneously performed, the use of the tub heater 225 within the washing course of the lower treatment device 200 is stopped, so that current consumption of the lower treatment device 200 and the upper treatment device 100 may not exceed the maximum allowable value for each household.

In addition, according to the method for controlling the laundry treatment apparatus, in a situation where the washing course of the lower treatment device 200 and the drying course of the upper treatment device 100 are simultaneously performed, when the operation of the steam generator 190 of the upper treatment device 100 and the washing course of the lower treatment device 200 are performed in an overlapping manner, the operation time of the washing course of the lower treatment device 200 may begin after the operation of the steam generator 190 is ended, so that current consumption of the lower treatment device 200 and the upper treatment device 100 does not exceed the maximum allowable value for each household.

In addition, according to the method for controlling the laundry treatment apparatus, in a situation where the washing course of the lower treatment device 200 and the drying course of the upper treatment device 100 are simultaneously performed, when the operation of the steam generator 190 of the upper treatment device 100 and the washing course of the lower treatment device 200 are performed in an overlapping manner, the lower driver of the lower treatment device 200 is controlled in a manner that current consumption of the lower treatment device 200 and the upper treatment device 100 does not exceed the maximum allowable value for each household.

In addition, according to the method for controlling the laundry treatment apparatus, in a situation where the washing course of the lower treatment device 200 and the drying course of the upper treatment device 100 are simultaneously performed, when the operation of the heat exchanger 150 of the upper treatment device 100 and the dehydration step (S174) from among the washing course of the lower treatment device 200 are performed in an overlapping manner, the heat exchanger 150 of the upper treatment device 100 is controlled in a manner that current consumption of the lower treatment device 200 and the upper treatment device 100 does not exceed the maximum allowable value for each household.

As is apparent from the above description, the method for controlling the laundry treatment apparatus according to the embodiments of the present disclosure can control the washing machine and the drying machine that are simultaneously operated, so that the maximum amount of current consumption of the washing machine and the drying machine does not exceed the amount of allowable current consumption for each household.

The method for controlling the laundry treatment apparatus according to the embodiments of the present disclosure can control the washing machine and the drying machine that are simultaneously operated, so that the washing machine is controlled according to the operation state of the drying machine in a manner that the maximum amount of current consumption of the washing machine and the drying machine does not exceed the amount of allowable current consumption for each household.

Accordingly, the present disclosure is directed to a method for controlling a laundry treatment apparatus that substantially obviates one or more problems due to limitations and disadvantages of the related art.

An object of the present disclosure is to provide a method for controlling a laundry treatment apparatus configured to control a washing machine and a drying machine that are simultaneously operated, so that the maximum amount of current consumption of the washing machine and the drying machine does not exceed the amount of allowable current consumption for each household.

Another object of the present disclosure is to provide a method for controlling a laundry treatment apparatus during simultaneous operation of the washing machine and the drying machine, so that the washing machine is controlled according to the operation state of the drying machine in a manner that the maximum amount of current consumption of the washing machine and the drying machine does not exceed the amount of allowable current consumption for each household.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a laundry treatment apparatus is disclosed. The laundry treatment apparatus includes an upper treatment device and a lower treatment device. The upper treatment device includes a drying drum in which target laundry to be dried is placed, an upper driver to rotate the drying drum, a circulation passage unit through which air flows into or out of the drying drum, a heat exchanger to dehumidify and heat the air, and a steam generator to supply steam to the drying drum. The lower treatment device includes a tub to store wash water therein, a washing drum provided in the tub so that target laundry to be washed is put into the washing machine and the laundry is washed and dried, a tub heater provided in the tub to heat the wash water, and a lower driver to rotate the washing drum. The method for controlling the laundry treatment apparatus includes performing, by the lower treatment device, a washing course including a water supply step, a washing (rinsing) step, and a dehydration step, and performing, by the upper treatment device, a drying course including a hot air supply step, a fan operation step, and a dryness sensing step, wherein the lower treatment device performs the washing course by changing a configuration of at least one of an operation of the tub heater, an execution time of the washing course, and an operation of the lower driver according to a progress state of the drying course, thereby performing the washing course.

The method may further include determining, by the lower treatment device, a progress state of the drying course; when the drying course and the washing course do not overlap each other, performing a predetermined washing course, and when the drying course and the washing course overlap each other, determining whether the drying course and operation of the tub heater overlap each other.

In the determining whether the drying course and the operation of the tub heater overlap each other, when the drying course and the operation of the tub heater overlap each other, the washing course is configured to exclude the operation of the tub heater; and when the drying course and the operation of the tub heater do not overlap each other, a predetermined washing course is configured to be performed.

The method may further include determining whether the steam generator operates, when the operation of the steam generator and a progress of the washing course do not overlap each other, performing a predetermined washing course, and determining whether the operation of the steam generator and the washing course overlap each other.

In the determining whether the operation of the steam generator and the washing course overlap each other, when the operation of the steam generator and the washing course overlap each other, a configuration of the washing course is changed in a manner that the washing course is performed after the operation of the steam generator is ended, and when the operation of the steam generator and the washing course do not overlap each other, a predetermined washing course is performed.

The method may further include determining, by the lower treatment device, a progress state of the drying course, when the operation of the drying course and the washing (rinsing) step do not overlap each other, performing a predetermined washing course, and when the drying course and the washing course overlap each other, determining whether the drying course and the washing (rinsing) step overlap each other.

In the determining whether the drying course and the washing (rinsing) step overlap each other, when the drying course and the washing (rinsing) step overlap each other, a configuration of the washing course is changed in a manner that a configuration of the lower driver is changed; and when the drying course and the washing (rinsing) step do not overlap each other, a predetermined washing course is configured to be performed.

An operation of changing the configuration of the lower driver is configured to control operation of the lower driver in a manner that driving efficiency of the lower driver is less than driving efficiency of the lower driver used in a predetermined washing course.

The upper treatment device changes a configuration of at least one of a time of the drying course and a heat capacity generated by the heat exchanger according to a progress state of the washing course, and performs the drying course.

The method may further include determining, by the upper treatment device, a progress state of the washing course, when the washing course and the drying course do not overlap each other, performing a predetermined normal drying course, and when the washing course and the drying course overlap each other, determining whether the dehydration step and the drying course overlap each other.

In the determining whether the dehydration step and the drying course overlap each other, when the dehydration step and the drying course overlap each other, a power-saving drying course for changing a configuration of the heat exchanger is performed, and when the dehydration step and the drying course do not overlap each other, a normal drying course is configured to be performed.

An operation of changing a configuration of the power-saving drying course is configured to control the heat exchanger such that the heat exchanger generates less heat capacity than the heat exchanger used in a predetermined normal drying course.

The power-saving drying course is performed for a relatively longer time than the normal drying course.

In the power-saving drying course, a compensation time according to a heat capacity generated by the heat exchanger is added to the power-saving drying course in preparation for a progress time of the normal drying course, so that the power-saving drying course is performed for the added resultant time.

The compensation time is increased compared to an overlapping time between the heat exchanger and the dehydration step.

The compensation time increases in inverse proportion to a heat capacity generated by the heat exchanger of the normal drying course in preparation for the heat capacity generated by the heat exchanger of the normal drying course.

The laundry treatment apparatus includes a main power line configured to receive power from an external power source, and an upper power line and a lower power line configured to receive power through the main power line in a manner that the upper power line is branched from the inside of the upper treatment device and connected to the upper treatment device, and the lower power line is branched from the inside of the lower treatment device and connected to the lower treatment device, wherein the upper treatment device and the lower treatment device are configured to simultaneously receive power through the upper power line and the lower power line, respectively.

It is to be understood that both the foregoing general description and the following detailed description of the present disclosure are exemplary and explanatory and are intended to provide further explanation of the invention as claimed.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a laundry treatment apparatus which includes an upper treatment device that includes a drying drum to dry laundry, an upper driver to rotate the drying drum, a circulation passage unit through which air flows relative to the drying drum, a heat exchanger to dehumidify and heat the air, and a steam generator to supply steam to the drying drum; and a lower treatment device that includes a tub to store wash water, a washing drum provided in the tub, a tub heater to heat the wash water in the tub, and a lower driver to rotate the washing drum, the method comprising:

performing, by the lower treatment device, a washing course that includes a water supply step, a washing step, and a dehydration step;

performing, by the upper treatment device, a drying course that includes a hot air supply step, a fan operation step, and a dryness sensing step;

determining, by the lower treatment device, an operation of the drying course; and changing an operational condition of the washing course to reduce a current consumption of the lower treatment device, when the operation of the drying course and an operation of the washing course are simultaneously performed, wherein the changing of the operational condition of the washing course by the lower treatment device includes changing at least one of a stop of the tub heater, delaying a start time of the washing course, or changing from a normal mode of the lower driver to a power-saving mode of the lower driver, wherein when the operation of the heat exchanger in the drying course is to overlap operation of the washing course, the operation of the lower driver is changed from the normal mode to the power-saving mode, and when the operational state of the drying course is determined to not overlap the operation of the heat exchanger, the performing of the washing course includes performing a predetermined washing course by the lower treatment device.

2. The method according to claim 1, further comprising:
determining whether the steam generator is to operate in the drying course when the operation of the drying course is determined to overlap the operation of the washing courses.

3. The method according to claim 2, wherein:
when the operation of the steam generator in the drying course is to overlap the operation of the washing course, the washing course is changed to be performed after staying in a standby mode by a completion of the operation of the steam generator in the drying course, and when the operational state of the drying course is determined to not overlap the operation of the steam generator, the performing of the washing course includes performing a predetermined washing course by the lower treatment device.

4. The method according to claim 2,
wherein a start time point of the washing course is changed to another time point after the operation of the steam generator is finished, when the operation of the steam generator in the drying course overlaps the operation of the washing course.

5. The method according to claim 1, wherein the power-saving mode of the lower driver includes changing driving efficiency of the lower driver to be less than driving efficiency of the lower driver when used in the predetermined washing course.

6. The method according to claim 1, further comprising:
   when the operation of the drying course is determined to overlap operation of the washing course, determining whether the heat exchanger is to operate in the drying course.

* * * * *